June 24, 1969 V. J. SCARAVILLI ET AL 3,451,722
RESILIENT MOUNTED CUTTER HEAD FOR TUNNELING MACHINE
Original Filed April 11, 1966 Sheet 1 of 5

INVENTORS
VICTOR J. SCARAVILLI,
& CHARLES J. DELISIO
BY
McNENNY, FARRINGTON, PEARNE & GORDON

ATTORNEYS

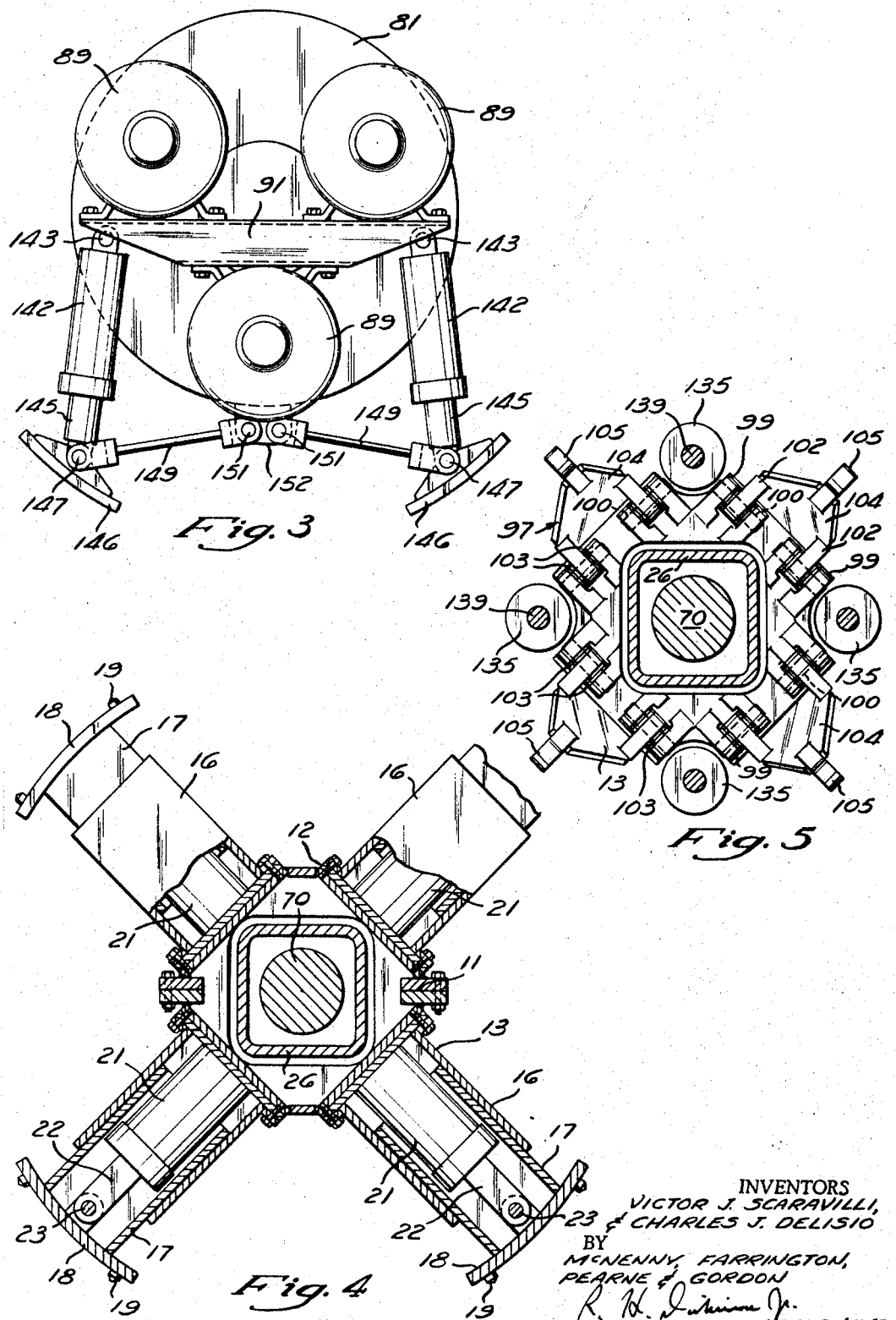

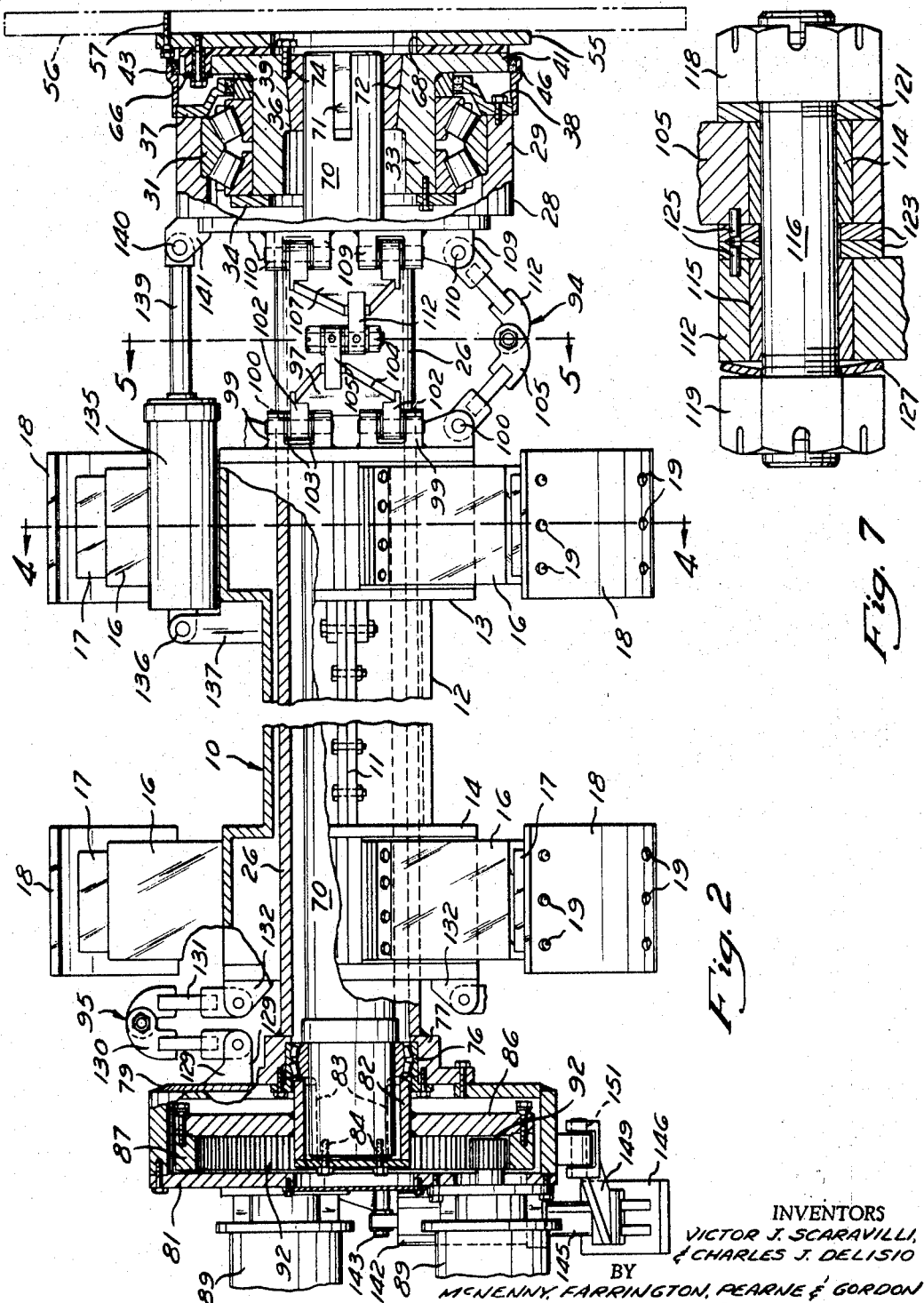

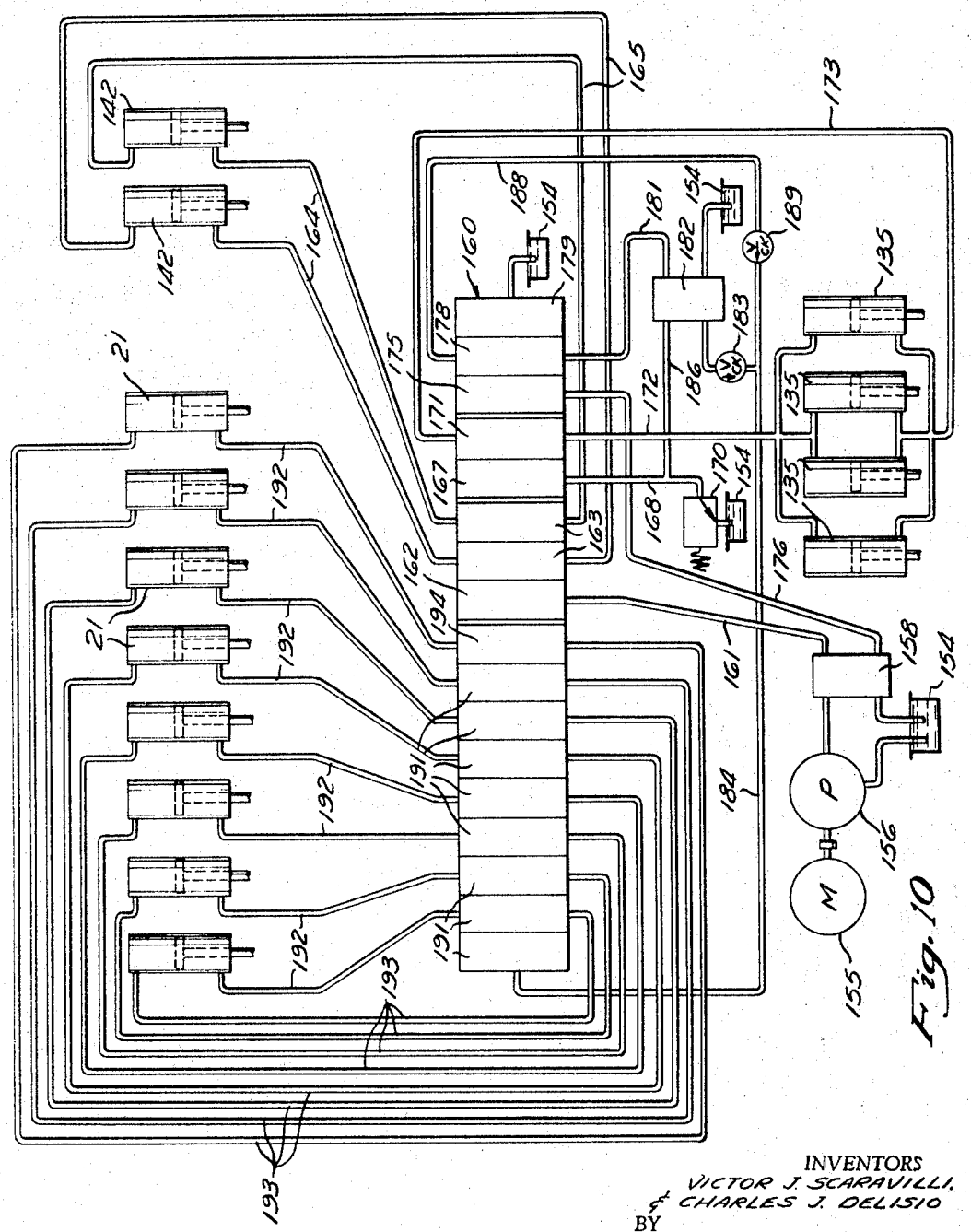

United States Patent Office 3,451,722
Patented June 24, 1969

3,451,722
RESILIENT MOUNTED CUTTER HEAD FOR TUNNELING MACHINE
Victor J. Scaravilli, Beechwood, and Charles J. Delisio, Lyndhurst, Ohio, assignors to S & M Constructors, Inc., Bedford Heights, Ohio, a corporation of Ohio
Original application Apr. 11, 1966, Ser. No. 541,673, now Patent No. 3,383,138, dated May 14, 1968. Divided and this application Dec. 4, 1967, Ser. No. 712,310
Int. Cl. E21c *15/00;* F16d *3/10;* E21b *17/02*
U.S. Cl. 299—90                    4 Claims

ABSTRACT OF THE DISCLOSURE

A tunneling machine having a support frame anchorable in a tunnel bore by four independently hydraulically actuated support feet at each of two axially spaced zones which provide the only anchoring of the support frame in the tunnel and by individual movement selectively position the axis of the support frame with respect to the axis of the tunnel. An elongated movable frame is carried on the support frame by two axially spaced sets of articulated torque arm assemblies which position the movable frame radially with respect to the support frame and transmit torque between the movable frame and the support frame. A cutter head is mounted on the front end of the movable frame by a large thrust bearing and a cutter head support plate is insulated from the remainder of the movable frame by a layer of elastomeric material to absorb and dampen shock transmission between the cutter and the bearing. The cutter head is rotatably driven by an elongated shaft which extends from the cutter head axially through the movable frame to a drive motor assembly at the rear end of the machine. At its rear end the movable frame has selectively operable support feet which allow the movable frame to be supported by its own support feet and the cutter head, while the support frame is advanced along the tunnel by the reversible push cylinders interconnecting the support frame and the movable frame to provide the necessary thrust to the cutter head.

---

This application is a division of our co-pending application, Ser. No. 541,673, filed Apr. 11, 1966 and now Patent No. 3,383,138.

This invention relates generally to tunneling machines and more particularly to tunneling machines having a rotary boring or cutting head for boring passages through hard rock and minerals.

The digging of a tunnel through soft material such as clay and soft rock or only partially consolidated materials has long been done by machines having a rotary cutting head having cutters which scrape and dig away at the material which is then collected and removed rearwardly from the tunnel. However, when such machines are used against harder materials, and particularly very hard igneous and metamorphic rocks, such scraping type cutters cannot be used and it is necessary to go to percussive type roller cutters which chip away small fragments from the mass of rock by impact. The use of such cutters has long been known for drilling walls and other relatively small diameter holes, but efforts to adapt such cutters to larger machines for use in drilling tunnels has met with considerable difficulty because of the necessary forces involved and the shock loads encountered. As a result, such cutters have been so slow and have encountered so many breakdown problems that it has been necessary to still use blasting type tunneling methods in such material. The use of blasting methods has been recognized as undesirable not only because of the problems of danger and expense, but also the fact that the tunnel walls tend to be irregular in shape and excessive fracturing of the walls requires considerable cementing and support to prevent possible collapse after the tunnel is dug. Thus, while the desirability of a tunneling machine for hard rock has long been recognized, heretofore none of the machines have been sufficiently practical to operate with a high enough degree of reliability and at a fast enough cutting rate to make them competitive with other tunneling methods.

Therefore, it is a principal object of this invention to provide a novel tunneling machine utilizing a fixed anchored carriage and an axially movable rotary cutting head adapted to cut even the hardest rock at a high rate of speed.

It is a further object of this invention to provide a novel tunneling machine as set forth in the preceding object which has an improved arrangement for anchoring the supporting frame in the previously dug tunnel which does not depend on the weight of the machine.

It is another object of this invention to provide a novel tunneling machine as set forth in the preceding objects which has an improved driving mechanism for the cutter head to allow efficient application and utilization of sufficient power to produce a high cutting speed.

It is another object of this invention to provide a novel tunneling machine as set forth in the preceding objects having a novel arrangement for transmitting the reaction and shock torques from the movable cutter head support to the supporting frame and for mounting and positioning the movable frame with respect to the fixed supporting frame.

It is another object of this invention to provide in a rotary cutter head a novel shock absorbing mounting to reduce the transmission of shock loads between the cutter supporting plate and the rest of the machine.

It is a further object of this invention to provide a new and improved tunneling machine which provides improved steering, easy accessibility of the machine while cutting, as well as high reliability and ease of repair or replacement of the component parts of the machine.

Briefly, the foregoing and further and additional objects and advantages of this tunneling machine are accomplished by providing a fixed supporting frame anchored in the tunnel wall by two axially spaced sets of projecting arms, each set of which has four arms equidistantly spaced and actuated by hydraulic cylinders to position the frame without regard to the weight of the machine. A movable frame is carried centrally within the supporting frame by sets of torque arms at each end which both support the moving frame and transmit the reaction torque from the moving frame to the supporting frame. A cutter head is mounted in bearings at the front end of the moving frame and carries a cutter plate having a number of roller cutters mounted thereon. The cutter plate is mounted to the rotating shaft by means of a shock absorbing and insulating mounting of elastomeric material arranged to allow a limited amount of relative movement to absorb shock loads. A drive shaft extends the length of the moving frame to project beyond the rear end of the supporting frame where the shaft is driven by a motor assembly. The long length of the drive shaft gives it a limited amount of torsional movement which absorbs the shock loads and prevents them from reaching the drive motors. Hydraulic cylinders acting between the supporting frame and the cutter head apply the force directly to the bearing supporting the cutter head to cause the moving frame to move relative to the supporting frame. After the moving frame has moved through its full range of movement, a jack is lowered at the rear end to support the moving frame by the jack and the cutter head to allow the supporting frame to have the arms retracted and move forward to the next position where the supporting frame is again anchored to allow the cutting movement to continue.

Further objects and advantages of this invention will become apparent to those skilled in the art upon a more complete understanding of the invention, the preferred embodiment of which is described in the following detailed description and shown in the accompanying drawings in which:

FIGURE 2 is an elevational view partially in section with parts broken away of the machine shown in FIGURE 1;

FIGURE 3 is a rear end elevational view of the machine;

FIGURE 4 is a cross-sectional view taken on line 4—4 of FIGURE 2.

FIGURE 5 is a sectional view with parts broken away for clarity taken on line 5—5 of FIGURE 2;

FIGURE 7 is a fragmentary cross-sectional view of the hinge pin of the torque arms;

FIGURE 10 is a schematic diagram of the hydraulic circuit of the machine.

Figure 1:
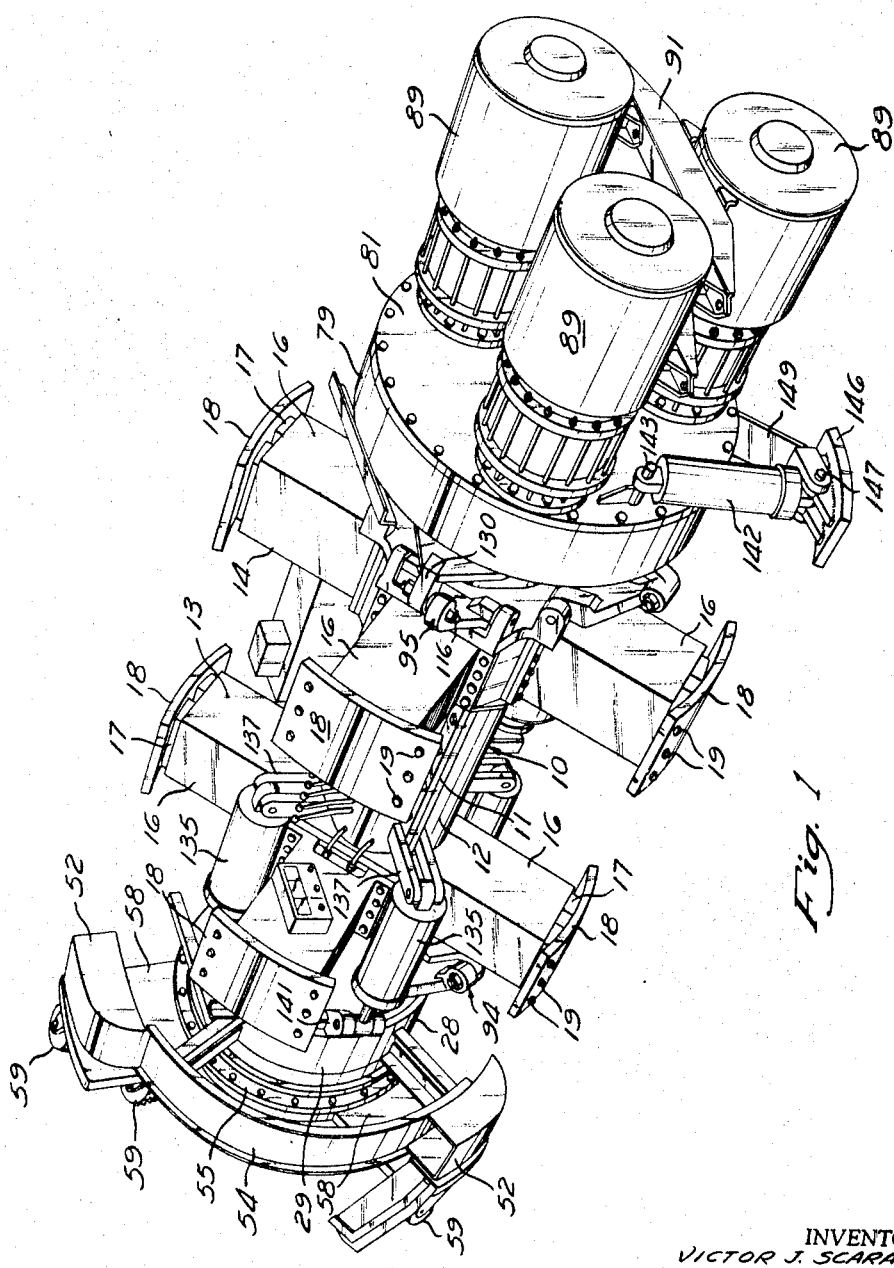
FIGURE 1 is a rear quarter perspective of a tunneling machine according to the present invention.

Referring now to the figures in greater detail, the general arrangement of the machine is best shown in FIGURES 1 and 2. The machine has a support frame indicated generally at 10 which is braced against the tunnel walls to position the machine in proper alignment and absorb the torque and thrust forces produced by the cutting action. The support frame 10 has a longitudinal tubular center section 12 which terminates at each end in a front support section 13 and a rear support section 14. For ease of assembly, the tubular section 12 may be formed of two chanel-like members joined together by bolts along a center line as at 11.

Each of the support sections 13 and 14 carry four radially extending holding feet, spaced equidistantly in planar alignment, which are pressed against the tunnel walls by hydraulic cylinders. For this purpose, each of the support sections, which, except as hereinafter described are identical, have four tubular guide collars 16 secured to their outer surfaces to guide the radially movable holding or support feet 17 which terminate at their outer ends in arcuate pads 18 which may be provided with projecting studs 19 to prevent slippage along the tunnel wall. The pads 18 may be either rigidly or pivotally attached to the feet 17, depending on whether it is necessary to cut a tunnel having a short radius of curvature. Within each of the guide collars 16 is a hydraulic holding cylinder 21 having a rod 22 connected at 23 to the foot pad to force the pad tightly into engagement with the tunnel wall. It will be seen that since the only contact between the support frame assembly 10 and the wall is at the eight pads 18, four on each of the two sections, the longitudinal axis of the tubular section 12 may thus be guided and aligned for steering purposes by adjusting the relative radial extension of the pads by the holding cylinders. Thus, the axis may be shifted by at one of the support sections extending one of the pads while retracting the diametrically opposite pad to shift the entire assembly. Since the support frame is not mounted on rails or wheels, this allows the axis of the support frame to be shifted without regard for the weight of the machine or the downward position.

Within the tubular section 12 is positioned a movable carriage frame tube 26 which floats freely within the tubular section 12 and extends beyond the front and rear support sections 13 and 14. At its front end, the carriage frame tube 26 carries an enlarged cutter head housing 28 having an annular axially extending outer wall 29 which supports the outer race of a bearing 31. The bearing 31 is preferably of the high capacity double row tapered roller type adapted to absorb both radial loads and thrust loads in either direction. The split inner race of bearing 31 is secured on the outer surface of a cutter head hub 33 to journal the latter for rotation with respect to the housing 28. A retainer plate 34 positions one side of the split inner race of bearing 31 whose other race is held by a bearing spacer 36 positioned between the bearing and a radial flange 41 on the hub 33.

The bearing 31 is sealed to prevent the entry of water and dirt at two places. An annular seal support plate 37 (see also FIGURE 6) is secured by screws 38 to the front edge of the annular wall 29 and carries a seal 39 adapted to make sliding sealing contact against the outer surface of the front bearing spacer 36. In addition, a seal support collar 43 is secured on the outer peripheral surface of the support plate 37 by screws 44 and is provided with a seal-receiving groove 45. Within groove 45 are inner and outer seals 46 and 47, held in place by a retainer plate 48, and arranged to make sealing contact with a smooth sealing surface 42 on the outer periphery of the radial flange 41. Both of the seals 46 and 47 have a flexible outwardly extending sealing lip which allows material to pass outward from within the sealed area but prevents the entrance of foreign matter. To enhance the effectiveness of this seal under operating conditions, grease fittings 51, a plurality of which are arranged around the periphery of the support collar 43, are arranged to allow intermittent injection of a lubricating grease or the like into the space between the seals 46 and 47 so as to wash out any foreign matter which might have entered past the outer seal 47 while still retained by the inner seal 46. The use of this intermittent injection of grease not only lubricates the seal but continually cleans it and insures that any rock chips wedged beneath the outer seal will be removed before more than a minimal amount of foreign matter can get past the outer seal.

The radial flange 41 on the cutter head hub 33 serves as the support for the cutter head assembly. This assembly includes a cutter support plate 55 extending parallel to the flange 41 and to which is secured the cutter plate 56 by suitable means such as bolts 57. The cutter plate 56 is shown as having three arms 58 (see FIGURE 1) on which are mounted the roller cutter assemblies 59. These cutter assemblies may be of any of the roller cutter type which have a rolling surface having projections adapted to impact and locally crush the rock so it breaks loose. The cutters 59 are spaced around the cutter plate 56 both in the center and along the arms 58 in a manner to provide a relatively uniform thrust loading on the plate centered on the axis of the bearing 31, and arranged in a staggered manner so that all portions of the rock face being cut are engaged by at least two cutters. Since the construction of the roller cutter assemblies 59 forms no part of this invention, they have not been shown or described in detail. It is also recognized that other types of cutters such as kerf cutters and the like may be employed if the machine is used in softer material more adapted to cutters of that type.

In order to remove the rock chips produced by the cutting action, scoops 52 are located on the rear faces of the cutter plate arms 58 and cooperate with a moldboard 54 supported on the cutter head housing as shown in FIGURE 1. The material picked up by the scoops 52 can then be discharged when they reach the uppermost position onto a suitable belt conveyor (not shown) which may be mounted on top of the machine between the upper holding legs to convey the material rearwardly of the machine.

An important feature of this invention is the mounting of the cutter support plate 55 to the radial flange 41 on the cutter head hub 33. A particular problem is encountered when local variations in the hardness of the rock produce a change of the torsional and thrust loads encountered by the cutters which results in a shock or impact loading being transferred to the cutter plate 56 and cutter support plate 55. Such high impact loads can be very damaging to the bearings and other structure because they may be of high intensity. Therefore, a shock absorbing resilient mounting is provided between the flange 41 and the support plate 55 in the form of a layer of elastomeric material interspacing the flange 41 and the support plate 55.

Figure 6:
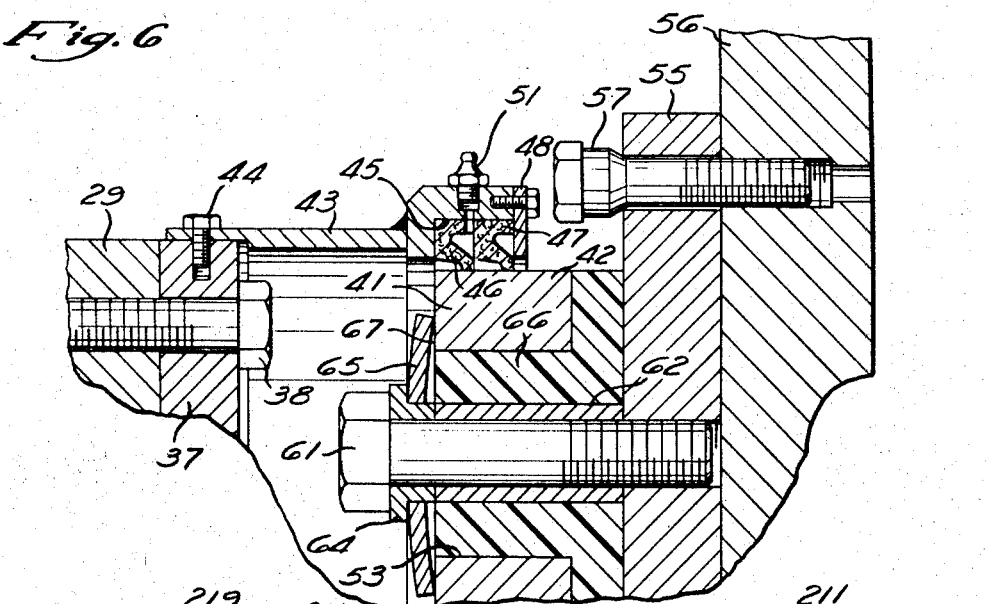
FIGURE 6 is an enlarged fragmentary cross-sectional view showing details of the mounting of the cutter support plate.

The details of this arrangement are shown generally in FIGURE 2 and in greater detail in FIGURE 6. The cutter support plate 55 is spaced from the flange 41 by a layer of elastomeric material 66 which is bonded to both of these members and secures them together. The radial flange 41 is provided with a plurality of openings 53 extending therethrough between its front and rear faces. Preferably, these openings 53 are spaced equidistantly around the face on the same radius and may be as high as twenty or thirty in number. A bolt or cap screw 61 is secured to the cutter support plate 55 and extends rearwardly through the opening 53 within which it is generally centered. A cylindrical sleeve 62 surrounds the bolt 61 to abut at its front end against the support plate 55 and at its rear end against a flanged collar 64 which in turn abuts against the head of the bolt 61. A conical spring washer or Belleville spring 65 is compressed by the coller 64 against the rear face of the flange 41 under an initial preload. The elastomeric material 66 fills the space between the sleeve 62 and the openings 53 and extends rearwardly as far as the rear face 67 of the flange 41.

Although a number of materials may be used as the elastomeric material, it has been found that a suitable and preferred material is a cast polyurethane polymer because of the ability of this material to be easily cast in place as a liquid resin and bond to the metal it is in contact with while providing a high degree of hardness and tensile strength with the ability to absorb impact loads. One such material is Novitane S, grade CU83 sold by the B. F. Goodrich Company, Industrial Products Division. The assembly may be easily made by mounting the hub 33 and cutter support plate 55 in a fixture which seals the outer edges while spacing them apart by the desired distance. The bolt 61 and sleeve 62 are assembled in place and a plain washer substituted for the flanged collar 64 and spring washer 65, and the bolt 61 is then tightened so that the washer seals off the rear face of the opening 53. The liquid polymer is then poured into the space to completely fill it in an annular zone around the central opening 68 in the cutter support plate 55 as well as in the openings 53. After the polymer has hardened, the assembly is then mounted on the machine after the plain washers have been replaced by the flanged collar 64 and spring washer 65.

When the machine is in operation, the compression loads from the cutters will be transmitted to the cutter plate 56 and then to the cutter support plate 55, so that the elastomeric material 66 will be in compression to absorb shocks and prevent them from being transmitted to the radial flange 41. Because the elastomeric material fills the space between the sleeve 62 and the opening 53, the torque applied to the cutters is also transmitted through the elastomeric material so that transient loads in both thrust and torque encountered by the cutters are not transmitted to the cutter head hub 33. The function of the spring washer 65 is normally to resiliently absorb rebound loads in the event that the loading on the cutter plate 56 is uneven to resist tilting and forces which might tend to break the bond between the elastomeric material and either the flange 41 or the cutter support plate 55.

The cutter head hub 33 and the cutter head assembly secured to it is rotatably driven by means of a drive shaft 70 within the carriage frame tube 26 and extending axially therealong back to the drive motor assembly which is located rearward of the rear support section 14. The drive shaft 70 is nonrotatably secured to the cutter head hub 33 by means of keys 71 and is clamped in place against axial movement by a tapered collar 72 secured in place within the hub by suitable means such as screws 74. The drive shaft 70 extends lengthwise through the carriage frame tube 26 to the rear end where it is rotatably journaled by a bearing 76 mounted within a bearing housing 77 secured to the rear end of the frame tube. The housing 77 also serves to support a cup-shaped drive housing 79 whose rear face is closed off by a plate 81. Within the housing 79 a drive hub 82 is non-rotatably carried by the rear end of the shaft 70 to which it is secured by means of keys 83 and screws 84. The hub 82 carries a drive wheel 86 to the rear face of which is secured an internal ring gear 87. A plurality of electric motors 89, shown as being three in number, are mounted by being secured to the rear plate 81 and connected together at their other ends by a bracket 91. Each of the motors 89 is positioned on the plate 81 so that a pinion gear 92 on its shaft is in driving engagement with the ring gear 87. This provides for a suitable gear reduction for the motors, so that the ring gear through the drive wheel 86 and hub 82 can rotate the drive shaft 70 to rotate the cutter head hub 33 and the cutter head assembly. Because of the long length of the drive shaft 70 and the extremely high torques and loads involved, it allows a certain amount of torsional damping of any torsional shock loads encountered by the cutter head assembly.

All of the moving carriage including the carriage frame tube 26, the cutter head assembly at the front end and the drive assembly at the rear end is supported on the support frame 10 to allow limited axial movement therealong by a pair of front and rear torque arm assemblies 94 and 95. These assemblies are identical and suspend the carriage frame without the requirement for any guide rollers or rails while also absorbing the rotating torque and side thrust loads imposed on the cutter head. The reaction torque to the driving force of the cutter head is transmitted along the drive shaft 70 to the rear drive assembly and therefore is taken up primarily by the rear torque arm assembly 95. The front torque arm assembly 94 thus basically serves to support the cutter head housing 28 and to absorb any lateral loads which may result from uneven cutting or a change in cutting direction.

Turning to the torque arm assemblies in greater detail, each assembly includes four articulated torque arm units arranged equidistantly in circular fashion so that they may operate together and insure positive axial alignment between the carriage frame tube 26 and the tubular support section 12. Each torque arm unit consists of, as seen in the front assembly, an inner arm 97 which is pivotally mounted on a pair of spaced yoke-shaped brackets 99 carried on the front face of the front support section 13. Each of the brackets 99 carries a pivot pin 100 on which are journaled a pair of ears 102 secured to the torque arm 97. Suitable thrust washers 103 are positioned between the sides of the ears 102 and the bracket 99 to transmit the forces from the torque arm to the brackets while permitting free rotation of the torque arm about the pivot pins 100. The torque arm has a generally triangular shaped center section 104 tapering from the ears 102 to a projecting ear 105 which is positioned slightly off center from the axis of the inner torque arm.

The torque arm unit includes an outer torque arm 107 which may be identical in shape with the inner torque arm 97. The outer torque arm 107 is pivotally journaled on a pair of spaced, yoke-shaped brackets 109 supporting pivot pins 110 and being secured on the rear face of the cutter head housing 28. The outer torque arm 107 likewise has an offset ear 112 which is pivotally connected to the ear 105 on the inner torque arm 97 as shown in greater detail in FIGURE 7. The ears 105 and 112 are bored to receive bushings 114 and 115, respectively, through which passes a pivot pin 116 which is secured against axial movement at its ends by lock nuts 118 and 119.

It will be understood that as shown, the cutter head rotates in a clockwise direction as seen from the rear so that it advances with what amounts to a right-handed helix. Thus, the reaction torque of the cutter head housing 28 and carriage frame tube 26 is in the opposite direction so that the reaction torque must be transmitted from the outer torque arm 107 to the inner torque arm 97. However, any sudden decrease in torque, after all wind-up has been taken out of the mechanism will tend to produce a relative movement in the opposite direction for which provision must be made. Accordingly, the nut 118 next to ear 105 is provided with a thrust washer 121 between it and the side of the car. A pair of thrust washers 123 are positioned between the ears 105 and 112 and non-rotatably secured to the respective ears by locating pins 125. A Belleville spring 127 is mounted between the other nut 119 and the ear 112. This allows the reaction forces to be taken up by the thrust washers 123, but in the event of any rebound action in the opposite direction, deflection of the spring washer 127 and the bearing provided by thrust washer 121 allow the shock to be taken up without exerting excessively high tensile loads on the pivot pin 116.

As shown in FIGURE 2 when the cutter head assembly is in the forward position, the rear torque arm assembly 95 is in the folded position while the front torque arm assembly 94 is in the extended position. While, as previously stated, most of the reaction torque is taken up by the rear torque arm assemblies, some of the torque may also be transmitted through the front torque arm assemblies. However, these assemblies are the same except that they are reversed end for end because the torque is being transmitted from the brackets 129 secured to the drive housing 79 to the outer arm 130 and from there to the inner arm 131 which is pivotally mounted on brackets 132 carried on the rear face of the rear support section 14.

In order to provide the necessary axial force for the cutters against the rock face being cut, a plurality of push cylinders are provided between the support frame 10 and the cutter head housing 28. As shown in FIGURES 4 and 5, there are four push cylinders arranged equidistantly about the front support section 13 between the guide collars 16. Each push cylinder 135 is connected by means of a pin 136 to a bracket 137 mounted at the rear face of the front support section 13 and tubular section 12. The cylinder 135 extends forward parallel to the axis of the machine between adjacent guide collars 16 and has a piston rod 139 connected by means of a pin 140 to a bracket 141 mounted on the rear face of the cutter head housing 28. By the use of the four cylinders of equal size and operating at the same pressure, the axial forces on the cutter head assembly will be balanced to minimize any beading loads on the carriage frame tube and drive shaft.

After the cutter head assembly has advanced the full stroke of the push cylinders 135 to the position generally shown in FIGURE 2, it is necessary to re-position the supporting frame in the tunnel at a more forward position so that the next cutting cycle may begin. While this is done by retracting all of the holding cylinders 21 and then reversing the push cylinders 135, it is necessary to support the carriage frame during this movement so that the support frame will be free from contact with the walls. At its front end, the cutter head assembly, having an outer diameter equal to that of the tunnel bore, is supported on the cutter plate arms 58. In order to support the drive mechanism at the rear end of the carriage frame, a pair of feet actuated by lift cylinders are provided for support at such times. As seen in FIGURES 1 through 3, a pair of lift cylinders 142 are located adjacent the drive motors 89 and at their upper end are connected to pivot pins 143 carried on the rear plate 81 of the drive housing 79. The lift cylinders 142 have downwardly extending push rods 145 which are connected to pads 146 by pivot pins 147. The pads 146 are curved to make contact with the curved tunnel walls and if desired, may have gripping studs on them. The pivot pin 147 also serves to connect the outer end of positioning arms 149 which at their inner end are connected by a pivot pin 151 to a bracket 152 secured to the bottom of the drive housing 79. The linkage formed by the arms 149 and lift cylinders 142 insures positive positioning of the pads 146 when the lift cylinders are actuated to support the drive housing and the rear end of the carriage.

Thus, when the cutter head assembly reaches the end of the stroke, the lift cylinders 142 are actuated to bring the pads 146 into contact with the tunnel walls to support the drive housing 79 in the position it is in. After this has been done, the holding cylinders 21 can be retracted to bring the foot pads 18 out of engagement with the tunnel wall. Then, the push cylinders 135 are reversed so that the support frame 10 moves forward until the push cylinders are fully retracted. In that position, the holding cylinders are again expanded to bring the foot pads 18 into contact with the tunnel wall so that the support frame 10 is tightly positioned in the tunnel. After this has been done, the lift cylinders 142 are used to retract the pads 146 and the push cylinders and drive mechanism can then be reactivated to start a new cutting cycle.

The hydraulic circuit of the machine is shown in detail in the schematic circuit diagram of FIGURE 10. The circuit includes an electric motor 155 adapted to drive a positive displacement hydraulic pump 156 which takes fluid from a suitable reservoir shown schematically at 154 and discharges it through a flow divider valve 158, which in turn directs the fluid through two separate lines according to the priority of the flow divider valve to a valve block assembly 160. All of these units are preferably and conveniently secured to the tubular section 12 of the support frame 10 between the front and rear support sections 13 and 14 so that they are easily accessible when the machine is in operation so that the operator can observe the cutting action, while the controls and the operator are in a relatively safe position spaced back from the cutting head.

The valve block 160 consists of a number of open-center hydraulic valves mounted in a stacked arrangement and connected to each other to have a common drain and supplied with fluid pressure by inlet sections.

The discharge from the flow divider valve 158 passes through two separate lines to the valve block 160, with the line 161 having a small priority flow being connected to an inlet section 162 of the valve block. From the inlet section 162, fluid is supplied to the adjacent pair of lift cylinder valves 163 which are connected by lines 164 and 165 to the lift cylinders 142 to provide for reversible actuation. As previously stated, the valves 163 are open-center valves so that if they are not in operation, which is the case except when the support frame is being positioned forwardly in preparation for another cutting cycle, substantially all of the fluid entering the inlet section 162 passes through to drain through the remaining units of the valve block.

The next unit in the valve bank is a second inlet section 167 which is supplied with fluid through line 168 in the manner described hereinafter. Inlet section 167 supplies fluid to a push cylinder control valve 171 connected through lines 172 and 173 to all of the push cylinders 135. It should be noted that all of these cylinders are connected in parallel so that they will operate as a unit at the same pressure so as to insure an even pushing action on the cutter head.

The next unit in the valve bank is a third inlet section, 175 which is supplied with fluid through line 176 having the larger amount of flow from the flow divider valve 158.

This third inlet section 175 supplies the fluid to a selector valve 178 which is utilized for selective control of the fluid supply for actuation of the holding cylinders in a manner to be described in greater detail hereinafter. The drain flow from the open-center valves 171 and 178 passes into a drain section 179 to return excess fluid back to the reservoir 154.

The selector valve 178 is operable in two directions to connect the flow from the inlet section 175 into either line 181 or line 188. Line 181 is connected to a flow divider valve 182 which has a low volume priority flow outlet connected through a check valve 183 to a line 184 which serves as the supply to the valves for the holding cylinders. The other outlet from flow divider valve 182 of lower priority but higher rate of flow is connected through line 186 to line 168 which supplies the fluid to the second inlet section 167. An adjustable relief valve 170 is connected to the line 168 so that the pressure level of the fluid supplied to the inlet section 167 may be easily regulated by the operator. Since the flow from inlet section 167 goes to the push cylinders 135, the relief valve 170 thereby serves as a convenient adjustment for the pressure in the push cylinders 135 and therefore as a means of regulating the axial force applied to the cutter head. The relief valve 170 is therefore operated in a manner that the cutting pressure may be maintained at the level giving the highest degree of cutting efficiency without danger of overloading the electric cutter drive motors 89, which could occur if too much pressure is applied to the cutter head. It will be seen that fluid is supplied to the inlet section 167 only when the selector valve 178 is in a position to discharge the fluid from the third inlet section 175 through line 181 to the flow divider valve 182. Under these conditions, only a small flow rate passes through the check valve 183 to the line 184 to provide a make-up fluid supply to the holding cylinders 21 so that these holding cylinders are pressurized at all times while cutting takes place.

When the selector valve 178 is shifted to the opposite position to discharge the fluid received from inlet section 175 into line 188, all of the fluid from the inlet section 175 is available to pass through the check valve 189 back to the line 184 to be available for actuation of the holding cylinders. Accordingly, line 184 is connected to the bank of eight holding cylinder control valves 191 for selective actuation of the holding cylinders 21 to which they are connected by lines indicated at 192 and 193. There is one valve for each holding cylinder connected in its own circuit to allow separate and independent actuation of the holding cylinders, and since these are open-center valves, the connection of the line 184 to one of the valves provides a supply for all of them. The holding cylinder control valves 191 are at the end of the valve block 160 opposite the drain section 179, and any excess flow which reaches the last holding cylinder control valve indicated at 194 then passes to drain through the drain passages through the remainder of the valve bank until it reaches the drain section 179 where it is returned to the reservoir as indicated at 154.

Turning now to the operation of the circuit, it will be assumed that the machine has finished a cutting cycle and the support frame has been moved to a forward position, that is with the carriage frame in a retracted position and the holding cylinders 21 are retracted. Since the push cylinders will then be inoperative and the lift cylinders locked, all of the valves in the system will then be in a neutral position. The next step is to expand the holding cylinders, and since these cylinders, because of the large forces they must exert, are of large diameter and stroke compared to the capacity of the pump, maximum flow is needed for the initial rapid movement to bring them into contact with the tunnel wall. In this case, the selector valve 178 is actuated to direct the fluid into the line 188 so that the full flow from flow divider valve 158 through line 176 will flow past the check valve 189 into the line 184 so that actuation of the holding cylinder valves 191 will move the cylinders at a maximum speed to allow the holding pads to re-engage the tunnel wall. After they have been moved into engagement or close to engagement, the selector valve 178 will be shifted to the other position where it will remain during the cutting cycle. This allows the fluid to flow into the line 181 to the flow divider 182 so that a small flow at all times will be provided into the line 184. This flow, because of the low volume, allows the holding cylinders to be actuated at a lower rate for precise positioning of the support frame, after which all of the holding valves 191 remain in the operating position to maintain the pressure in the holding cylinders during the cutting action, and this small flow will then be more than sufficient to overcome any leakage in the system.

After the support frame has thus been positioned, the lift cylinder valves 163 will then be actuated to retract the lift cylinders after which the valves will return to the neutral position. When this is done, the push cylinder valve 171 will be actuated to direct the fluid flow through the push cylinders to start the cutting action. Of course, the control of the electric motors is independent of the hydraulic system and these will be started before the push cylinders are actuated and stopped when the retraction portion of the cycle is started. Thus, the flow divider 182 operates together with the selector valve 178 and the check valves 183 and 189 to allow a selective large and small volume for the holding cylinders. The other flow divider valve 158 operates to allow only a small flow through the lift cylinder section so that most of the pump output flow is available at the third inlet section 175.

When the cutting cycle is completed, the drive motors will be turned off and the push cylinder valve 171 returned to the neutral position. The lift cylinder valve 163 will then be actuated to extend the lift cylinders 142 after which the holding cylinders will be retracted. To allow for high speed retraction, the selector valve 178 is thus reversed to the position to direct the flow into the line 188 for fast retraction. After this is done, the selector valve 178 is again reversed to supply fluid to the second inlet section 167 and the push cylinder valve 171 is actuated to reverse the action of these cylinders and then shift the support frame in a forwardly direction. Selector valve 178 is then moved to direct fluid into the line 188 for best operation of the holding cylinder 21.

Figure 8:
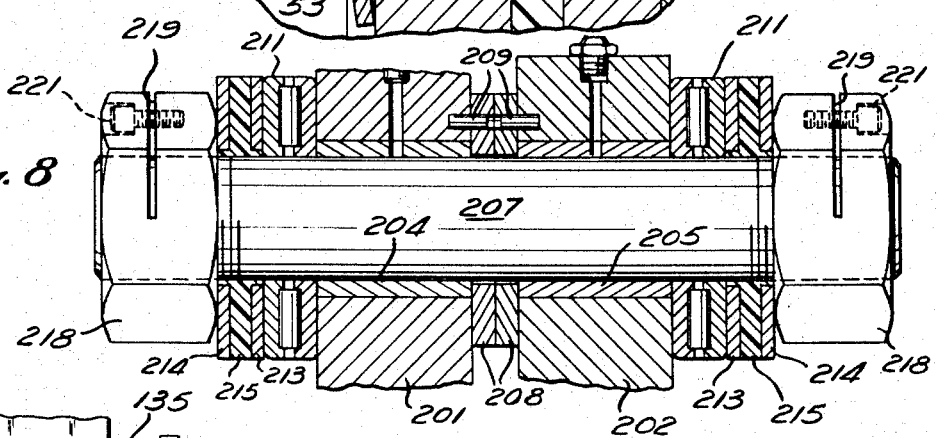
FIGURE 8 is a fragmentary cross-sectional view showing another embodiment of the torque arm hinge pin.

Because the torque arms are required both to support the load of the carriage structure, transmit the reaction torque to the support frame and resist shock loading both from impact and from torque fluctuations, it is important the the pivot connection between the two parts of the torque arm be able to absorb resilient shock loads in a direction opposite to the normal torque transmitting direction. An alternative construction for the torque arm pivot pin is shown in FIGURE 8. The torque arms are generally constructed the same as torque arms 97 and 107 and have projecting ears 201 and 202. Within the ears 201 and 202 are suitable bushings 204 and 205 which rotatably and slidably journal a pivot pin 207. The torque arms 201 and 202 are spaced apart by a pair of hardened thrust washer bearings 208 which are non-rotatably positioned on the torque arms by locating pins 209. Immediately outward of the torque arms are a pair of roller thrust bearings 211, one on each side and positioned around the pivot pin 207. Outward of each of the roller bearings 211 is a resilient thrust washer assembly including an inner washer 213 and an outer washer 214 of a suitable rigid material such as steel. The washers 213 and 214 are spaced apart axially and spaced radially from the surface of the pivot pin 207 by an elastomeric material indicated at 215. This material is preferably a polyurethane resin and may be of the same type as that used for the mounting of the cutter assembly. The outer ends of the pivot pin 207 are threaded to receive nuts 218 which serve to provide a loading on the thrust-absorbing washer assemblies and the bearings as well as to absorb the reverse thrust forces when the torque arms are urged apart. In order to lock the nuts 218 securely in position on the pivot pin, the nuts have a slot 219 extending parallel to their faces and substantially halfway through the nuts. A lockscrew 221 is threadedly engaged on one side of the slot with its head on the other slot so that by tightening the edges of the slot 219 are brought together. By this action, the internal threads on the nut are distorted in the manner to firmly clamp the nut in position. With this arrangement, the normal driving forces are taken up through the hardened thrust washers 208 in the same manner as in the torque arm pivot pin arrangement shown in FIGURE 7. However, when reverse forces tend to separate the torque arms, both arms will tend to slide along the pivot pin to compress the elastomeric material 215 and allow resilient absorption of the shock loads.

As previously pointed out, because the reaction force of the drive for the cutter assembly takes place at the drive housing 79, the rear torque arm assemblies are primarily responsible for transmitting the torque to the support frame and the front torque arm assemblies connected to the front support section 13 are used principally to position the carriage frame tube 26 and to absorb radial and tengential impact loads from the cutter head. Therefore, it is possible to substitute a suitable bearing for the front torque arm assemblies if the bearing will be able to absorb these radial and tangential loads, thereby leaving to the rear torque arm assembly the transmission of the driving torque between the drive housing and the support frame.

Figure 9:
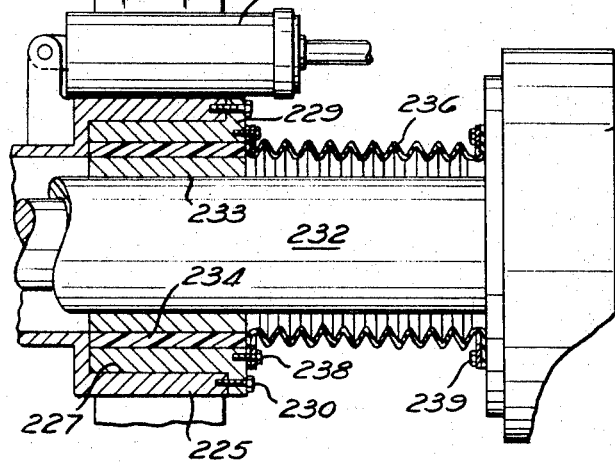
FIGURE 9 is a fragmentary elevational cross-sectional view showing an alternative mounting for the front support for the moving frame.

An alternative arrangement of this type is shown in FIGURE 9 where the front support section 225, generally corresponding in structure to the front support section 13, is provided at its forward end with an annular recess within which is fitted an outer sleeve 229 secured in place by bolts 230. The carriage frame tube 232 has a cylindrical section at this point which is slidably journaled within a suitable bearing 233 to allow the longitudinal reciprocation of the tube 232. The bearing 233 is spaced radially from the sleeve 229 by a layer of elastomeric material 234 which may be of a polyurethane elastomer mentioned herein above. With this arrangement, the bearing 233 is positively positioned with respect to the tube 232 against radial movement, while the bearing is given limited radial movement by the elastomeric material 234 in order to absorb such shock loads. To provide a seal around the bearing 233 to prevent the entrance of rock dust and other material which would quickly damage the barrel, a tubular bellows 236 is clamped at 238 to the outer sleeve 229 and at its other end clamped at 239 to the rear face of the cutter head housing 240.

While the invention has been shown and described in detail hereinabove, it is recognized that various modifications and rearrangements will occur to those skilled in the art upon a full comprehension of this invention, and such modifications and rearrangements may be resorted to without departing from the scope of the invention as defined in the claims.

What is claimed is:
1. A cutter head assembly for a tunneling machine comprising a driven member mounted for rotation about an axis, a cutter support plate member, a layer of elastomeric material interposed between said driven member and said cutter support plate member constructed and arranged so that the torque and thrust from said driven member is transmitted through said elastomeric layer to said cutter support plate member, and a plurality of axially extending fastener units interconnecting said driven member and said cutter support plate member to allow limited resilient movement between said members whereby said fastener units operate to limit movement of said cutter support plate member away from said driven member and limit relative rotation between said members.

2. A cutter head assembly as set forth in claim 1 wherein said fastener units are rigidly connected to one of said members and resiliently connected to the other of said members.

3. A cutter head assembly for a tunneling machine comprising a driven member mounted for rotation about an axis, a radial flange on said driven member having front and rear axially spaced radially extending faces, a cutter support plate spaced axially in front of said flange, a layer of elastomeric material bonded to said front face of said flange and said cutter support plate and filling the space therebetween so that the thrust from said cutter support plate is transmitted through said elastomeric material to said flange, and a plurality of resilient fastening units extending axially between said cutter support plate and said flange to allow limited forward movement of said cutter plate away from said driven member to limit the tension in said layer of elastomeric material tending to break the bond of said elastomeric material with said flange and said cutter support plate.

4. A cutter head assembly for a tunneling machine comprising a driven member, a radial flange on said driven member having front and rear axially spaced radially extending faces, a plurality of axially extending openings through said flange, a cutter support plate spaced axially in front of said flange, a layer of elastomeric material bonded to said flange and said cutter support plate and filling the space therebetween so that the thrust from said cutter support plate is transmitted through said elastomeric material to said flange, said elastomeric material filling said flange openings, a projection on said cutter support plate extending rearwardly through each of said flange openings and said elastomeric material so that said elastomeric material allows limited torsional movement between said projections and the sides of said openings, and spring means between the ends of said projections and the rear face of said flange to allow limited tilting movement of said cutter plate relative to said driven member.

References Cited
UNITED STATES PATENTS 2,633,008   3/1953   Tocci-Guilbert _____ 64—27 X
3,342,530   9/1967   Krekeler _____ 299—92 X ERNEST R. PURSER, *Primary Examiner.*

U.S. Cl. X.R.
64—27; 175—320

PO-1050
(5/69)

UNITED STATES PATENT OFFICE
CERTIFICATE OF CORRECTION

Patent No. 3,451,722      Dated June 24, 1969

Inventor(s) Scaravilli & Delisio

It is certified that error appears in the above-identified patent and that said Letters Patent are hereby corrected as shown below:

Column 1, line 61, change "walls" to --wells--.

Column 7, line 19, change "car" to --ear--.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents